March 13, 1945.  G. R. CUTHBERTSON  2,371,382
CELLULAR RUBBER CHLORIDE
Filed April 28, 1942
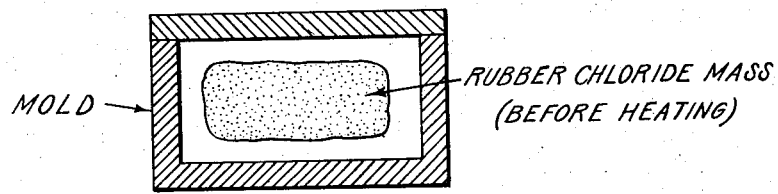
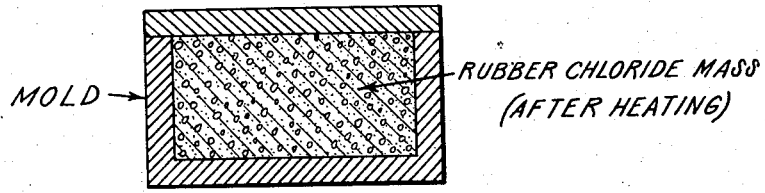
INVENTOR.
GEORGE R. CUTHBERTSON
BY
Lester J. Budlong
ATTORNEY Patented Mar. 13, 1945

2,371,382

UNITED STATES PATENT OFFICE 2,371,382

CELLULAR RUBBER CHLORIDE

George R. Cuthbertson, Detroit, Mich., assignor to United States Rubber Company, New York, N. Y., a corporation of New Jersey Application April 28, 1942, Serial No. 440,847

2 Claims. (Cl. 18—53)

This invention relates to improvements in the production of expanded rubber chloride products.

An object of the invention is to produce expanded rubber chloride of the closed-cell type. A further object is to provide a simple process for making such material without the use of high pressure equipment or elaborate shaping apparatus. Other objects will be apparent from the following description.

According to the present invention, it has been discovered that when a compact mass or masses of rubber chloride having a small total surface area relative to its bulk is placed in a mold of desired shape and of somewhat greater size, and is heated to a temperature or temperatures in the range from about 300° F. to about 350° F., evolution of volatile products takes place within the interior of the mass to such an extent that the rubber chloride expands and substantially completely fills the mold, and the rubber chloride is obtained in an expanded closed-cell form provided that the mold is kept closed until the rubber chloride has cooled below its hardening temperature. The shape of the expanded mass is determined by the shape of the mold.

Powdered rubber chloride does not permit such a result; the total surface of the powder is so great, relative to its bulk, that substantially all the volatile products evolve from the surface of the material and hence exert no expanding effect. It has therefore been found to be necessary to the present process to use relatively large or coarse pieces of rubber chloride, i. e., pieces comparable in size to one-quarter-inch cubes, rather than finely divided material. The less the number of pieces, the stronger the bonding within the final piece. Preferably, a large single piece of rubber chloride should be used to load each mold. The piece or assembled pieces should, preferably, be so approximately shaped as to be geometrically similar to the final piece desired. Preferably, each dimension of the original piece of rubber chloride placed in the mold should be approximately one-half of the corresponding dimension of the final expanded object.

Fig. 1 of the drawing represents a cross-section in plan of the assembly of mold and rubber chloride mass before heating; and Fig. 2 represents a similar cross-section showing the condition in the mold after heating.

Rubber chloride herein is to be understood as including the commercial material as well as large proportions of the same with plasticizers, fillers, or diluents.

An advantage of expanded rubber chloride is that it is substantially fire-proof and may be used for all purposes where gas-expanded hard rubber is used.

It will be apparent to those skilled in the art that modifications may be made in the amounts of material and nature of the rubber chloride, with consequent variation in temperatures effective to blow the material, without departing from the principles of the invention as covered by the appended claims.

Having thus described my invention, what I claim and desire to protect by Letters Patent is:

1. A process for producing an expanded rubber chloride product which comprises placing a mass of non-powdered rubber chloride in a mold of the shape of the desired article, said mass being smaller than the mold cavity but sufficient to fill the cavity upon expansion, heating the mass to a temperature in the range from about 300° F. to about 350° F. until the gases evolved from the rubber chloride per se at said temperature expand said mass to fill the mold, discontinuing the heating and maintaining the mold closed until the rubber chloride has cooled below its hardening temperature before removing the same from the mold.

2. A process for producing an expanded rubber chloride product which comprises placing in a mold of the shape of the desired article, a mass of non-powdered rubber chloride composed of a piece or pieces of selectively large size sufficient to permit expansion thereof by evolved gas from the rubber chloride per se on heating, said mass being smaller than the mold cavity but sufficient to fill the cavity upon expansion, heating the mass to a temperature in the range from about 300° F. to about 350° F. until the said evolved gases expand said mass to fill the mold, discontinuing the heating and maintaining the mold closed until the rubber chloride has cooled below its hardening temperature before removing the same from the mold.

GEORGE R. CUTHBERTSON.